(12) United States Patent
Stevens

(10) Patent No.: US 7,230,522 B2
(45) Date of Patent: Jun. 12, 2007

(54) POWER LINE COMMUNICATION DEVICE AND METHOD

(76) Inventor: Carlile R. Stevens, P.O. Box 8290, Horseshoe Bay, TX (US) 78657

( * ) Notice: Subject to any disclaimer, the term of this patent is extended or adjusted under 35 U.S.C. 154(b) by 160 days.

(21) Appl. No.: 10/839,224

(22) Filed: May 6, 2004

(65) Prior Publication Data

US 2005/0248440 A1    Nov. 10, 2005

(51) Int. Cl.
*G05B 11/01*    (2006.01)
(52) U.S. Cl. .................. 340/310.11; 340/635; 340/644
(58) Field of Classification Search ........... 340/310.11, 340/635, 644
See application file for complete search history.

(56) References Cited

U.S. PATENT DOCUMENTS 6,538,909 B2 *    3/2003   Goodarzi et al. ............. 363/98
6,747,883 B2 *    6/2004   Yasumura ..................... 363/98

* cited by examiner

*Primary Examiner*—Julie Bichngoc Lieu
(74) *Attorney, Agent, or Firm*—Colin P. Abrahams

(57) ABSTRACT

The present invention relates to the field of transferring information over the power line to and/or from the device or devices powered by said power line. For devices that may be powered by either alternating current (AC) or direct current (DC) their operation may be controlled by which type of power they are receiving, AC, +DC or −DC. Data may also transmitted by alternating the polarity of each half cycle of the power line, on a one half by one half cycle basis, in a controlled manner such that the powered device may receive such data to control its mode of operation. A method of reducing the heat in the switching devices and a system of encoding the data such that each powered device may have a different address and therefore may return data when requested is also disclosed.

7 Claims, 4 Drawing Sheets

POWER LINE COMMUNICATION DEVICE AND METHOD

BACKGROUND OF THE INVENTION

1. Field of the Invention

The present invention relates to the field of transferring information over the power line to and/or from the device or devices powered by said power line.

2. Brief Description of the Prior Art

There are many varied public domain circuits involving transmitting information data on a power line while that line is also supplying power to devices connected to it. The electric power utility companies have been using it for years. There are also proprietary methods of accomplishing such data transmission. My U.S. Pat. No. 5,264,823 discloses one such method. All of the current methods have one or more draw backs that prevent them from being used in all applications. These draw backs include loading of the data signal placed on the power line by the devices being powered by that line, electrical noise picked up by the line or created by the loads on the line being interpreted as valid data and cross talk between other data sources. Some prior art circuits involve changing the shape of the sine wave present on the power line and, as a result introducing harmonic distortion back to the utility supplying the power.

SUMMARY OF THE INVENTION

Accordingly, the above problems and difficulties are obviated by the present invention which incorporates a method of changing how the power is supplied by the power line to the connected load. When supplying power to devices that use a bridge rectifier in their input, that converts the incoming AC voltage to DC voltage, the input power may be AC, +DC or −DC with no adverse effect on the operation of the powered device. In its simplest form the disclosed invention may cause the powered device or devices to operate in two separate states in response to which one AC or DC is applied to its input. The next level of operation would be to cause the powered device to operate in three different states depending on whether AC, +DC or −DC is applied to its input. In the concepts more complex form, the three different types of drive can be alternated from one to the other as a means of transmitting data from the power source to the devices being powered without creating any harmonic distortion. Because only the devices down stream from the source of power receive the information there is no possibility of cross talk with devices powered on separate legs. Additionally, it is very easy to send AC data on a DC power line. Thus, a device may be addressed in the manner discussed above and then it may respond to the power source by sending AC data back to the power source during a following DC interval. A typical application of the inventive concept disclosed herein would be to drive one or more controllable output fluorescent ballasts where the data supplied to the powered ballast will determine the light level output.

Therefore, it is among the primary objects of this invention to supply a simple means of controlling a powered device by altering the type the power supplied to that device.

It is another object of this invention to send data to powered devices on a line by modulating the type of power supplied to said powered devices.

Yet another object of the invention is to allow the powered device to respond as to its condition of operation.

Still another object of the invention is to accomplish all of the above objects without introducing any harmonic or other form of distortion on the power line.

It is yet still another object of the invention to send data to the powered devices in such a manner that it is not possible for powered devices on a different power line but connected to the same power source to receive data intended for another powered device.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

OPERATIONAL DESCRIPTION OF THE PREFERRED EMBODIMENTS

Figure 1:
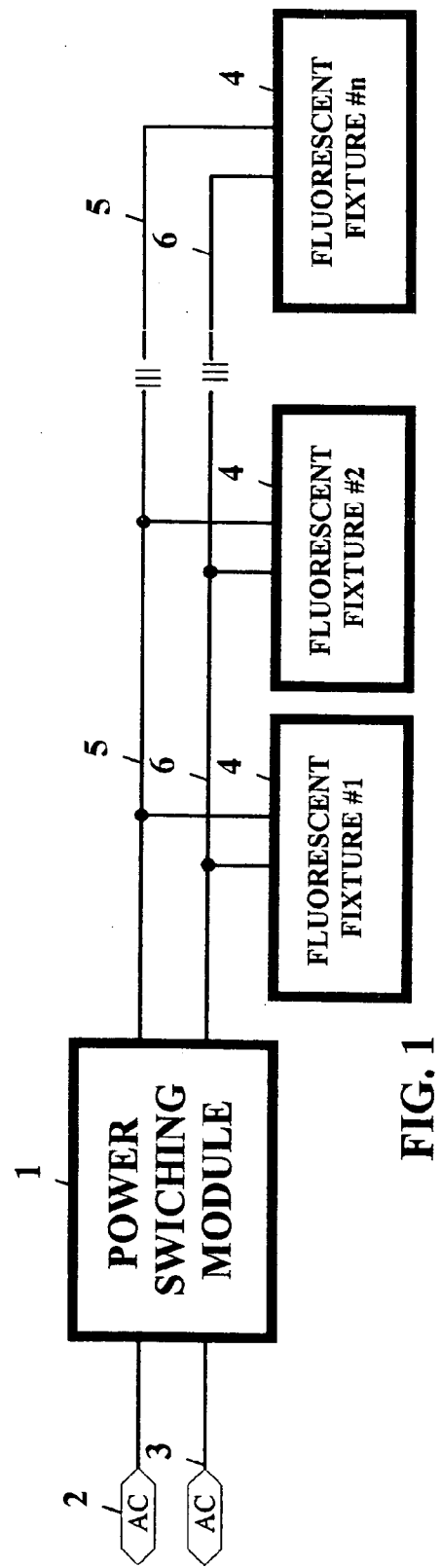
FIG. 1 is a block diagram of a typical application of disclosed invention being used to control a series of fluorescent lighting fixtures.

Referring now to FIG. 1, the disclosed invention is contained in block 1, the Power Switching Module. AC line power enters at terminals 2 and 3 and is supplied to the powered devices, in this case fluorescent fixtures 4, by wires 5 and 6. Power Switching Module 1 may contain the circuits depicted in FIGS. 2, 3 or 4 or any other circuit that is capable of supplying AC, +DC or −DC in response to local or remote selection.

Figure 2:
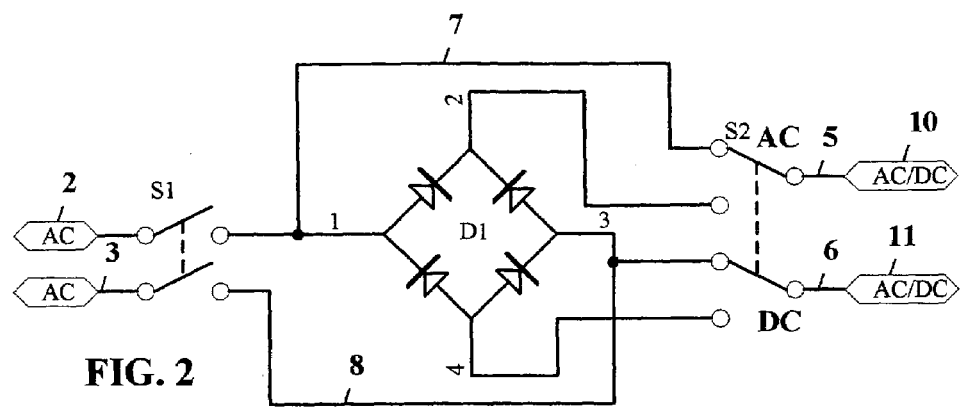
FIG. 2 is a schematic representation the disclosed concept in its simplest form.

FIG. 2 depicts the simplest form of the preferred embodiment. The output at terminals 10 and 11 is either the same AC power that is input to the device or +DC power depending upon the position of switch S2. Switch S1 is an optional off/on switch. With switch S1 in the shown position, power flows on wire 7 to one set of contacts on switch S2, through the switch to wire 5 which is connected to output terminal 10 and on wire 8 to the other set of contacts on switch S2, through the switch to wire 6 connected to output terminal 11. Wires 7 and 8 also connect to pins 1 and 3, which are the AC inputs to bridge diode D1. The output of bridge diode D1, Pins 2 and 4, is connected to the other set of contacts of switch S2. When the position switch S2 is as shown the output at 10 and 11 is the same as the input at 2 and 3. When S2 is set to its other position the outputs 10 and 11 are connected to diode bridge D1 and the output will be +DC. The fluorescent fixtures 4 of FIG. 1 would, in this case, sense this change from AC to DC and change the light level to some predetermined amount.

Figure 3:
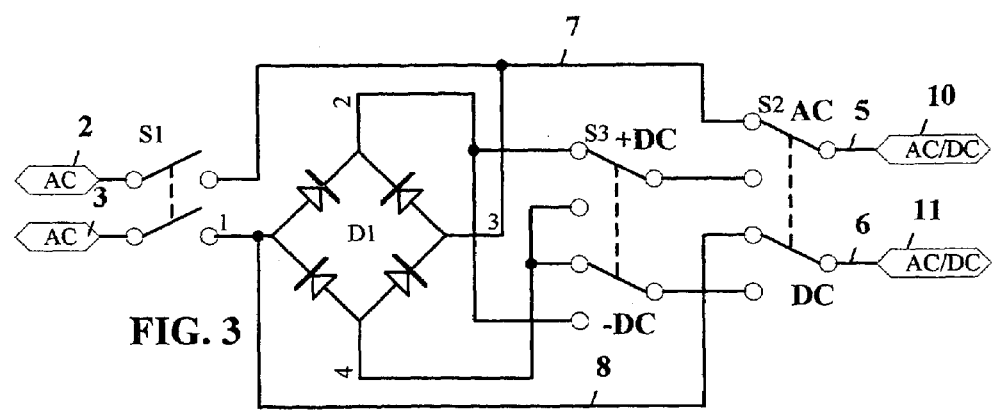
FIG. 3 is a schematic representation of a more complex three level control using the disclosed concept.

FIG. 3 is the same as FIG. 2 except that a second switch S2 has been added. In this case, switch S2 still shifts the output at 10 and 11 from AC to DC but when switch S2 is in the DC output position switch S3 switches the output to and from +DC or −DC. When the circuit of FIG. 3 is incorporated in block 1 of FIG. 1 then the powered devices, in this case fluorescent fixtures, can be switched to three states of operation or light levels, as would be the case with fluorescent fixtures.

Figure 4:
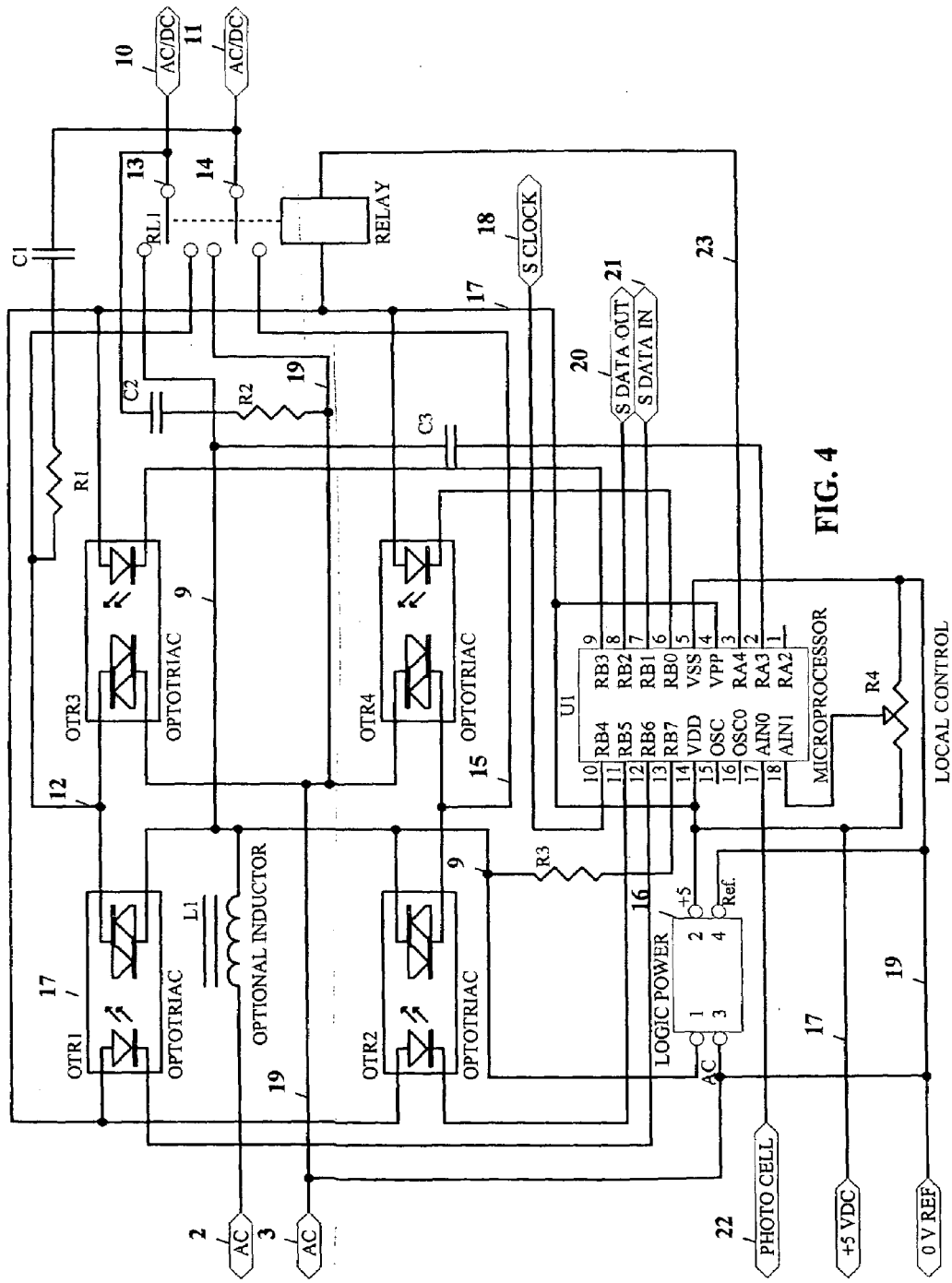
FIG. 4 is a schematic representation of the preferred embodiment of the disclosed invention where the type of power is alternated in such a manner as to send data to the powered devices.

The preferred embodiment depicted in FIG. 4 is a more complex and perhaps a more useful implementation of the herein disclosed concept in that the condition of the supplied power to the powered devices may be varied in relation to time to supply data to the powered devices. A control element, in this case a microprocessor, controls a bridge consisting of four triacs. The triac bridge may be switched such that it acts as a bridge supplying +DC or as a bridge supplying −DC at the output of the power switching module of FIG. 1. Although the triacs may be switched to supply AC as well as DC at the output, an optional relay may be added as shown in FIG. 4 as RL1, This relay connects the input to the output when no data is being transmitted. This relay eliminates the heat generated in the triacs, due to their forward drop, when only power and no data is to be transmitted. Since the triacs may be used to carry all switching currents the relay contacts will not be subject to wear and a small inexpensive relay may be used.

As can be seen by examining FIG. 4, when the relay is relaxed in the non data transmission mode AC input is connected, through optional inductor L1 via wire 9 through the top contact of relay RL1 directly to the output terminal 10. In the same manner the AC the input at wire 3 is directly connected via wire 19 through relay RL1 to the output terminal 11. When data is to be sent the relay RL1 is pulled in to connect the lower set of contacts to the outputs terminals 10 and 11. The production of a +DC output is accomplished as follows: When the input terminal at 2 is positive with respect to the terminal at 3 (the positive AC half cycle) positive current is conducted through triac OTR1 via the optional inductor L1, wire 9 and wire 12 to the bottom contact of contact set 13 of relay RL1 to the output at 10. Return current from the load enters at output terminal 11 through the bottom contact set 14 of relay RL1 to triac OTR4 via wire 15 and wire 19 to the second AC input terminal 3. During the opposite half cycle of the AC line, positive current flows in at input terminal 3 to triac OTR3 and via wire 19 then, as before, via wire 12 to the bottom contact of contact set 13 of relay RL1 to the output at 10. As during the positive half of the AC line voltage cycle current returns at output terminal 11 through the bottom contact of contact set 14 of relay RL1 to wire 15 but during this half cycle the current now flows through triac OTR2 back via wire 9, optional inductor L1 to the AC input terminal 2. Thus for either AC line half cycle the output at 10 and 11 is +DC.

The production of a −DC output is accomplished as follows: When the input terminal at 2 is negative with respect to the terminal at 3 (the negative AC half cycle) negative current is conducted through the optional inductor L1, triac OTR1 via wire 9 and wire 12 to the bottom contact of contact set 13 of relay RL1 to the output at 10. Negative return current from the load enters at output terminal 11 through the bottom contact set 14 of relay RL1 to triac OTR4 via wire 15 and wire 19 to the second AC input terminal 3. During the positive half cycle of the AC line current, negative current flows in at input terminal 3, wire 19 to traic OTR3 and via wire 12, as before, to the bottom contact of contact set 13 of relay RL1 to the output at 10. As during the negative half of the AC line voltage cycle, negative current returns at output terminal 11 through the bottom contact of contact set 14 of relay RL1 to wire 15 but during this half cycle the current flows through triac OTR2 back via wire 9 through optional inductor L1 to the AC input 2. Thus for either AC line half cycle the output at 10 and 11 is −DC.

It should be noted that the same triacs are being used for the generation of +DC and −DC but they are being switched on during opposite AC line half cycles thus they will conduct in the reverse direction when −DC output is required than the direction they conduct when +DC output is required. For this to be accomplished the microprocessor software must monitor the AC power line input. To accomplish this the common of the microprocessor U1 (Vss) is referenced to one side of the AC line voltage input and the other side of the AC line voltage input is supplied to microprocessor U1 at input 13 though voltage dropping resistor R3. As the triacs operate at different reference potentials optotriacs are employed for isolation. Each optotriac contains a light emitting diode (LED) that when energized switches into conduction the triac with which it is associated. The microprocessor U1 energizes the proper LED within the optotriac when it is time to switch that triac into conduction. Pulse transformers, direct coupling with current limiting resistors and conventional triacs may be used instead of optotriacs if it is cost effective for the specific application.

Logic power to operate the microprocessor, the optotriacs and the relay is supplied by Logic Power Supply 16 which may be any form of the many power supplies on the market today that converts the AC line power, shown supplied at pins 1 and 3, with an output of, in this case, +5V shown at pin 2 and the common reference at Pin 4. The +5V is distributed on wire 17 to each optotriac, the relay RL1 and the microprocessor U1 at the Vdd pin 14. The +5V is also output on line 19 for operation of the Photocell or other external control devices, as discussed below. The 0 V reference from the power supply on line 17 is also output for external control devices for convenience even though it is common to one side of the AC power line.

Figure 5:
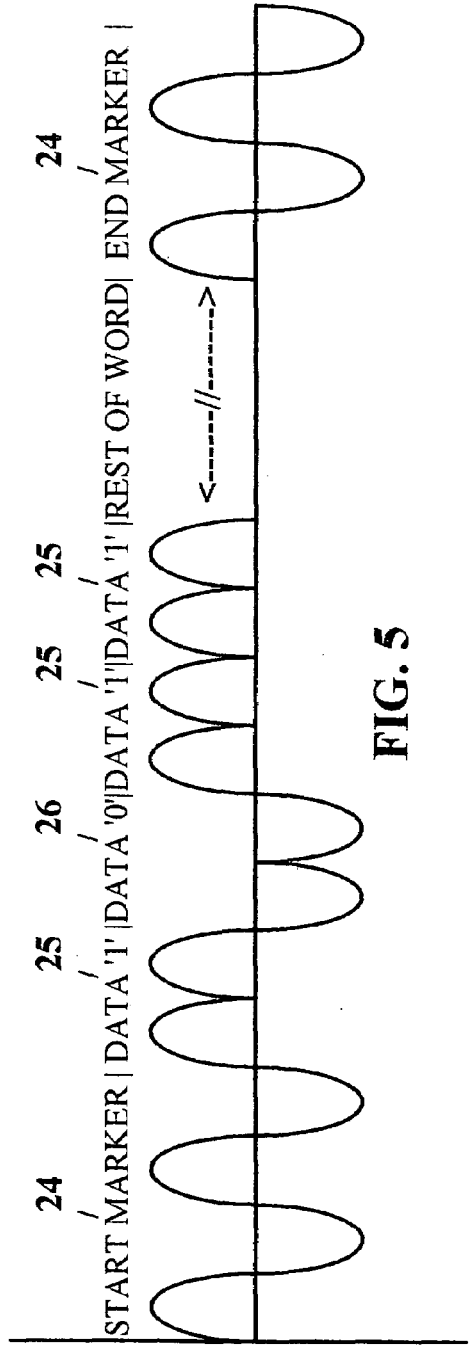
FIG. 5 depicts a graphic representation of one method of coding the switching of the types of power to send data to the powered devices.
Figure 6:
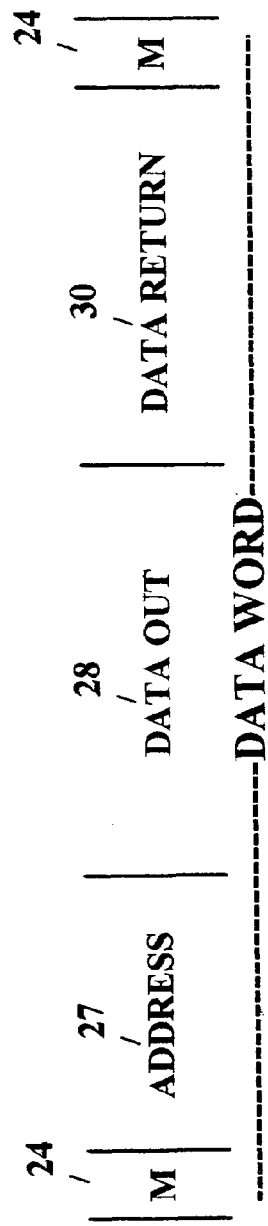
FIG. 6 shows how the data of FIG. 5 is organized into a word with each of the multiple words associated with one or more of the powered devices connected to its output.

The software in the microprocessor U1 may develop any number of code sequences that the powered devices connected to the Power Switching Module's output are programmed to receive and decode. To demonstrate how data may be transmitted, FIGS. 5 and 6 depict one coding sequence to accomplish the required date transfer. Refer now to FIG. 5 which depicts the internal coding of a word of data. The start and end of each data word is 'marked' by a marker of two AC line cycles 24. In between the start and end markers there is a series '1' and '0' digital data bits. A '1' bit is represented by two positive AC line half cycles 25 while a '0' bit is represented by two negative AC line half cycles 26. Since each data bit, either '1' 25 or '0' 26, consist of two half cycles of the same polarity they are easily distinguished from markers 24 in which each half cycle changes polarity. Such a system increases the reliability of the data transmission.

FIG. 6 depicts a complete data word as it may be broken down. Each data word contains as series of bits comprising an address 27, following the start marker, that identifies the connected powered device for which the data is intended. More than one device may have the same address if the devices with the same addresses are to have the same performance. The number of address bits depends on the number of connected devices. As an example, a four bit address would allow the addressing of sixteen different powered devices. Following the address, a number of bits 28 are allocated for data to be transmitted to the addressed device. Again as an example, if a fluorescent fixture were being addressed, six bits of data could be used to request sixty-four different light levels one of which could be off. Optionally, a portion or the word 30 may be set aside for return data from the addressed device. In this case, during the time that the return data is expected the voltage to the devices may be −DC during which time the powered device places relative high frequency positive bursts on the power line. These high frequency bursts would be sensed by the microprocessor, in this case via DC blocking capacitor C3 connected between power wire 9 and microprocessor at pin 2. In the case that data return is desired, it may be necessary to add the optional inductor L1 to prevent the high frequency, generated by the power devices during data return, from getting on the power line and effecting other systems connected to the same power line. Also if the data return feature is utilized each powered device must have its own address.

One of the advantages of the disclosed concept is that only devices connected down line from the Power Switching Module are effected by data transfer out and therefore there can be no cross talk between other devices connected to the same power source. The only possibility of cross talk would be when powered devices are sending information back using high frequency bursts as discussed above. In this event the problem is resolved by adding the optional inductor L1 to block the high frequency bursts from the input power source.

Referring back to FIG. 4, it can be seen that there may be three different methods of determining what data needs to be sent down line to the powered devices. In the case of the example depicted in FIG. 1 the light output of the fluorescent fixtures connected to the output of the Power Switching Module may be controlled in three different ways. A photocell input 22, which monitors the amount of light on the surface illuminated by the fluorescent fixtures, can tell the microprocessor to transmit code to tell the fluorescent fixtures to adjust the amount of light output to maintain a constant amount of light on the illuminated surface. The amount of light desired may be set, with or without the photocell feedback, by the setting of the local control potentiometer R4. Serial Clock 18, Serial Data Out 20 and Serial Data In 21 connected at pins 10, 8 and 7 respectively of microprocessor U1 represent an RS232 serial type data port. This port would allow a remote computer to program the devices powered by the disclosed invention utilizing the programming method discussed above. Such a remote computer control system could also be a DALI control protocol.

During the time that data in not being sent or received, which would normally be 99% of the time, the relay RL1 is in the relaxed position and the output of the Power Switching Module is connected to its input. When data is to be transferred the appropriate optotriacs are switched on to carry the load before the relay is activated. This is done synchronized with the power line voltage to minimize any wear on the relay contacts. When all the data has been transferred the optotriacs are kept operational until the relay RL1 has switched to carry the AC current. Resister R1 and capacitor C1 are connected as a snubber across one set of the relay contacts to carry the load for the very short time the relay contacts are moving. Resistor R2 and capacitor C2 provide the same snubbing action for the other set of relay contacts.

What is claimed is:
1. A data communication system comprising:
  a source of alternating current and voltage;
  a means for converting said source of alternating current and voltage to direct current and voltage, said means for converting said source of alternating current and voltage to direct current and voltage connected to said source of alternating current and voltage;
  one or more powered devices that are responsive to changing their mode of operation depending on whether or not they are supplied with alternating current and voltage or direct current and voltage while still being able to draw operational power from either source of alternating current and voltage or direct current and voltage; and
  a first switching means that alternately connects said one or more powered devices to either the said source of alternating current and voltage or the output of said means for converting said source of alternating current and voltage to direct current and voltage.

2. The data communication system of claim 1 wherein:
  a second switching means is interposed between said first switching means and the output said means for converting said source of alternating current and voltage to direct current and voltage to reverse the polarity of said means for convening said source of alternating current and voltage to direct current and voltage.

3. A data communication system comprising:
  a source of alternating current and voltage;
  a means for converting said source of alternating current and voltage to direct current and voltage, said means for converting said source of alternating current and voltage to direct current and voltage connected to said source of alternating current and voltage;
  one or more powered devices that are responsive to changing their mode of operation depending on whether or not they are supplied with alternating current and voltage or direct current and voltage while still being able to draw operational power from either source of alternating current and voltage or direct current and voltage; and
  said means for converting said source of alternating current and voltage to direct current and voltage comprising four switching elements connected in a bridge configuration with the direction of conduction of said four switching elements adjustable to vary the output of said means for converting said source of alternating current and voltage to direct current and voltage on a one half cycle of said source of alternating current and voltage basis to adjust the polarity of each one half cycle of the output of the means for converting said source of alternating current and voltage to direct current and voltage.

4. A data communication system of claim 3 wherein:
  an extremely low impedance circuit connected across said means for converting said source of alternating current and voltage to direct current and voltage comprising four switching elements connected in a bridge configuration during that period when only conventional alternating current and voltage power is to be supplied to said powered devices to relieve said means for converting said source of alternating current and voltage to direct current and voltage from conducting any current during said period.

5. A method of communicating over a conventional alternating current and voltage power line wherein the polarity of each one half cycle is deliberately alternated, on a half cycle by half cycle basis, to transmit data to a device powered by said conventional alternating current and voltage power line, with said device powered by said conventional alternating current and voltage power line capable of operating normally on either alternating or direct current and voltage.

6. A method of communicating over a conventional alternating current and voltage power line wherein the polarity each one half cycle is not bedeliberately alternated, on a half cycle by half cycle basis, transmit data to a device powered by said conventional alternating current and voltage power line, with said device powered by said conventional alternating current and voltage power line capable of operating normally on either alternating or direct current and voltage.

7. A method of communicating over a conventional alternating current and voltage power line of claim 6 wherein:
   data is returned from said device powered by said conventional alternating current and voltage power by a signal placed on the power line by said device powered by said conventional alternating current and voltage during a period identified by a code of alternating polarity AC line one half cycles.

* * * * *